United States Patent [19]
Pennington, III et al.

[11] Patent Number: 5,220,124
[45] Date of Patent: Jun. 15, 1993

[54] LAUNCHING SYSTEM

[75] Inventors: John W. Pennington, III, Spotsylvania; Joseph F. Sharrow, King George, both of Va.

[73] Assignee: The United States of America as represented by the Secretary of the Navy

[21] Appl. No.: 908,716

[22] Filed: Jun. 23, 1992

[51] Int. Cl.⁵ ............................. F41F 5/02; B64D 1/04
[52] U.S. Cl. .................................... 89/1.51; 244/137.4
[58] Field of Search .............................. 89/1.51, 1.58; 221/312 A, 279; 222/390; 244/137.4

[56] References Cited

U.S. PATENT DOCUMENTS

| | | | |
|---|---|---|---|
| 2,528,945 | 11/1950 | Carpenter | 89/1.51 |
| 4,444,085 | 4/1984 | Dragonuk | 89/1.51 |
| 4,466,332 | 8/1984 | Van Sloun | 89/1.51 |
| 4,522,104 | 6/1985 | Degen | 89/1.51 |
| 4,699,161 | 10/1987 | Smith et al. | 221/279 |
| 5,076,134 | 12/1991 | Marshall et al. | 244/137.4 |

*Primary Examiner*—David H. Brown
*Attorney, Agent, or Firm*—Elmer E. Goshorn

[57] ABSTRACT

An improved launching system for use on a platform and for selectively and controllably dispensing one or more elements of predetermined shape in carrying out its mission as used on any suitable platform; such as, e.g., an aircraft. The system is generally made up of elongated sleeve means being closed at one end and also having an aerodynamic profile as required. Depending upon the requirements of the system, it can be provided with external or internal control means. The system is generally comprised of selectively programmable motor-driven, feed-screw propelling means. The propelling means is arranged within the sleeve means such that the propelling means when in a retracted position provides a chamber for receiving one or more elements to be temporarily stored in nested but axially aligned relation to each other until selectively dispensed. Resiliently biased means are provided for positively retaining one or more elements between the propelling means and the outer open discharge end of the sleeve means until each element is dispensed by the propelling means. Also, resiliently biased locking means are provided for positively retaining the propelling means in its fully extended position so as to prevent accidental dispensing thereof during system use.

11 Claims, 6 Drawing Sheets

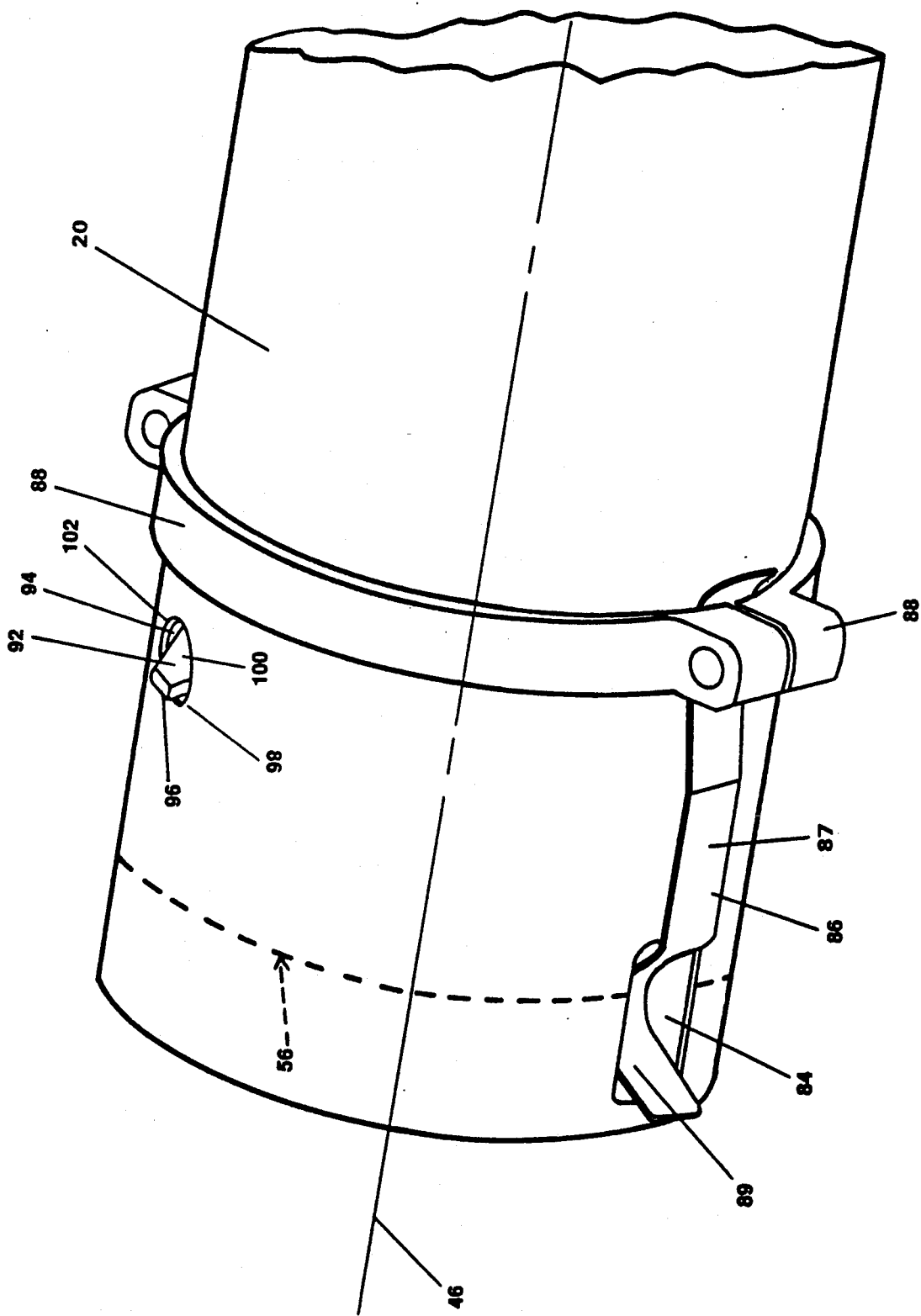

LAUNCHING SYSTEM

This invention relates to a launching system for dispensing one or more elements of predetermined shape and, more particularly, it relates to an improved launching system having sleeve means and selectively programmable propelling means arranged in the sleeve means, with the system being useable on a platform such as, e.g., an aircraft; and with the system being for selectively and controllably dispensing one or more elements of predetermined shape therefrom in relation to a targeted area when the propelling means is actuated during system use.

BACKGROUND OF THE INVENTION

Various dispensing devices have been designed in the past to meet a number of needs. For example U.S. Pat. No. 4,522,104 to M. Degen relates to an attachable bomb dispensing device for use on an aircraft. The device is suspended from a wing and is provided with a housing of aerodynamic shape. The tail end of the housing is provided with an opening for receiving and dispensing one or more bombs during use. The nose end of the device is provided with a selectively positionable cover for controlling the air flow through the interior of the housing and in turn the dispensing of one or more bombs stored therein. U.S. Pat. No. 4,666,332 to P.H. Van Sloan discloses a mine dispensing device for use on a platform. The device is provided with a tubular housing having a closed end and an open end for selectively receiving or dispensing one or more mines stored therein. A pull string is selectively wrapped about each mine as it is received in the opening for storage until discharge. Upon pulling the outer free end of the string one or more stored mines are selectively discharged from the housing in relation to one or more designated target areas. However, none of the aforementioned references whether taken alone or in any combination remotely suggest the improved attachable dispenser of the instant invention. More specifically, the dispenser is generally made up of a tubular housing of aerodynamic shape having a conically shaped nose tip or closed end. The other or open discharge end freely receives one or more elements of predetermined shape for temporarily storing same in the housing means between its ends until one or more stored elements are dispensed in accordance with the invention.

The housing at its open end is provided with diametrically opposed spring means for biasingly retaining each element in the storage chamber until dispensed. To facilitate positive and controlled dispensing of each stored element, the housing is provided with an internal power-driven-feed-screw-advanced propulsion means or pressure plate for abuttingly engaging the innermost stored element in the chamber. The pressure plate is provided with diamtrically opposed outwardly biased lugs that are hingedly mounted for positvely preventing accidental dispensing of the pressure plate when in an extended position during dispenser use. By virtue of the integrated construction of the dispenser, it is readily attachable to a platform as well as it is readily loadable with elements to be selectively dispensed therefrom. Moreover, the improved dispenser is repeatedly useable for launching one or more elements to impact any designated target area during use.

SUMMARY OF THE INVENTION

An object of the invention is to provide an improved launching system that is readily attachable to a platform when used.

Another object of the invention is to provide an improved launching system that is repeatedly reuseable and readily reloadable after each use.

Still another object of the invention is to provide an improved launching system that is capable of receiving and storing a plurality of elements to be selectivey and controllably dispensed in relation to one or more designated target areas; all in carrying out a mission, during launching system use on a given platform.

In summary, the improved launching system is preferably suspended from an aircraft platform. The system is generally made up of a tubular housing that is closed at one end. To minimize drag, when the system is used on a moveable platform, the housing can have an appropriate aerodynamic shape, such as, e.g., a conically shaped end. The system is generally comprised of a selectively programmable motor-driven, rotatable-feed-screw-advanceable pressure plate means for selectively discharging one or more elements stored in the housing means interior. The plate means is mounted in the interior of the housing means between its ends such that when the plate means is in a fully retracted position within the tube means interior, the tube means can store a maximum number of elements. Cooperative slot and key means are provided on the housing means and the plate means so as to prevent rotation of the plate means as it is advanced between positions in either direction during rotation of the feed screw means as the tube means is being used. The feed screw of the propelling plate means is arranged coaxial with the longitudinal axis of the housing means and is of a length extending to the discharge end of the tube means. Depending upon the requirements of the housing means, an external or internal power source can be provided for powering the motor driven plate means; such as, e.g., an internally mounted battery.

To positively retain and resiliently release each element when stored and selectively discharge same from the housing, diametrically opposed portions of the housing means at its open end is provided with opposed apertures for receiving opposed leaf spring elements attached to the housing means exterior in a sutable manner. These leaf spring elements positively engage the forward-most stored element at any time in the storage chamber of the housing means thereby positively retaining and resiliently releasing one or more stored elements in the storage chamber. At the same time, to prevent accidental discharge of the plate means when it is fully extended after discharge of the last stored element from the housing means, the plate means is provided with diametrically opposed pivotally mounted lug means that are resiliently biased in opposed outward radial directions relative to each other. Another set of diametrically opposed apertures are provided at the discharge end of the housing means. This second set of aperture means are arranged in the housing means offset from the first set of aperture means but axially aligned in relation to the lug means. Each lug means is designed so that when the plate means is fully extended, it positively engages a portion of the housing means defining the aperture means associated therewith so as to prevent accidental discharge of the plate means during launching system use. Also, each lug means is designed so that when the plate means is retracted from its fully extended position, the lug means will be biasingly urged to a retracted inward position as the plate means is retracted from its fully extended or any other extended position to an inner position during system use. To facilitate retraction of the plate means from any extended position, a spring biased tether means is provided between the plate means and the housing means.

Although not heretofore mentioned, each one of the dispensable elements used in the housing means can be all of the same and predetermined shape, such as, e.g., of shallow can-like configuration and provided with a concentric aperture for freely receiving the feed screw when any element is loaded into the housing means chamber or discharged therefrom.

Other objects and advantages of the invention will become more apparent when taken in conjunction with the specification, claims and drawings as will now be described.

BRIEF DESCRIPTION OF THE DRAWINGS

FIG. 5 is a fragmented perspective view on an enlarged scale as taken along 5—5 of FIG. 4 (and with parts added and other parts removed); and illustrates further details of the invention.

DETAILED DESCRIPTION OF THE INVENTION

Figure 1:
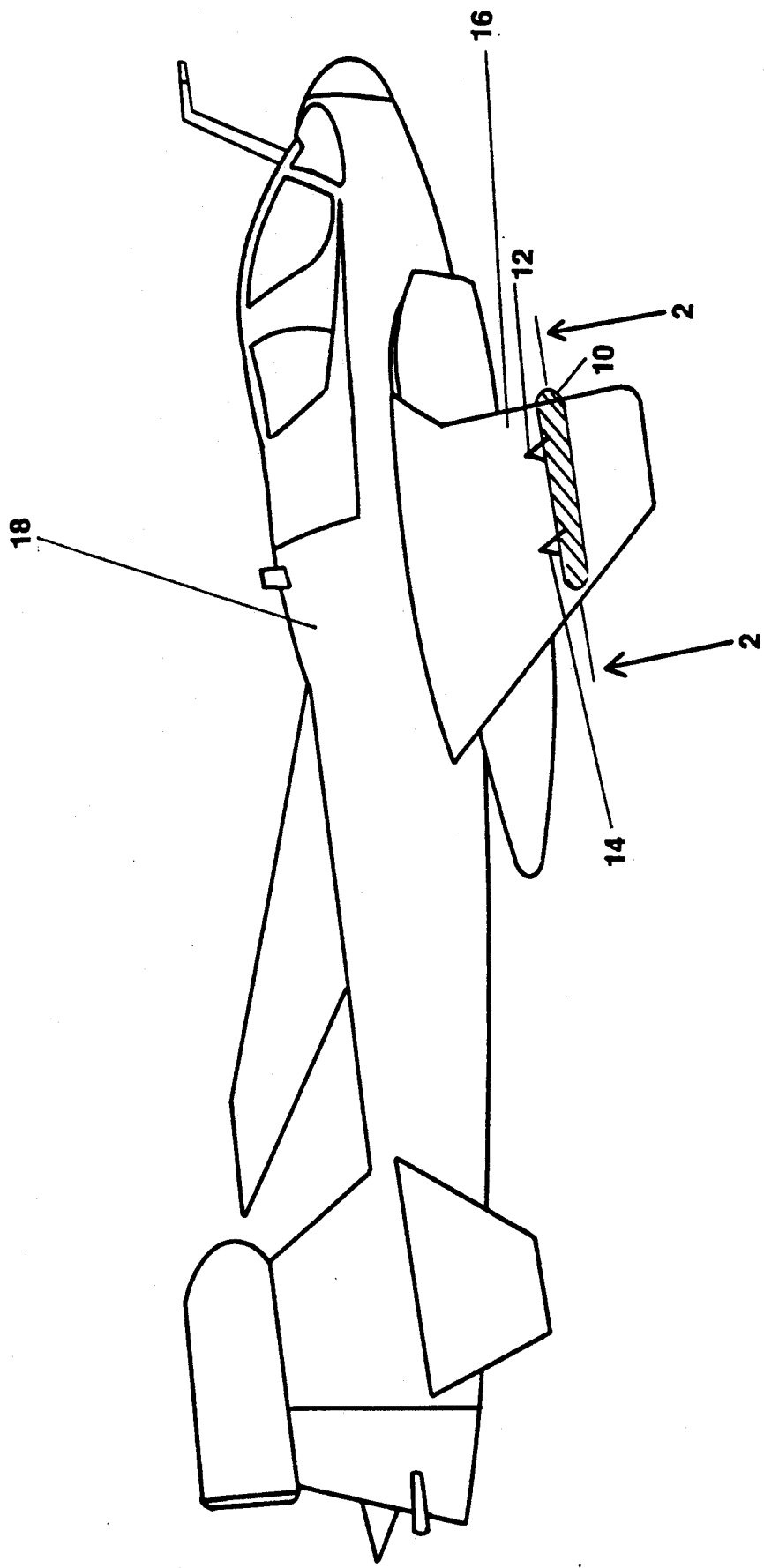
FIG. 1 is a perspective view of an aircraft and illustrates an embodiment of an improved launching system of the invention attached thereto.

With further reference to FIG. 1, it illustrates an embodiment of an improved launching system 10 suspendably affixed by a pair of longitudinally spaced brackets 12 and 14 affixed in suitable fashion to the underneath portion of a wing 16 of an aircraft 18. It is to be understood that the improved system can be readily attached in any suitable manner to any fixed or movable platform as required.

Figure 2:
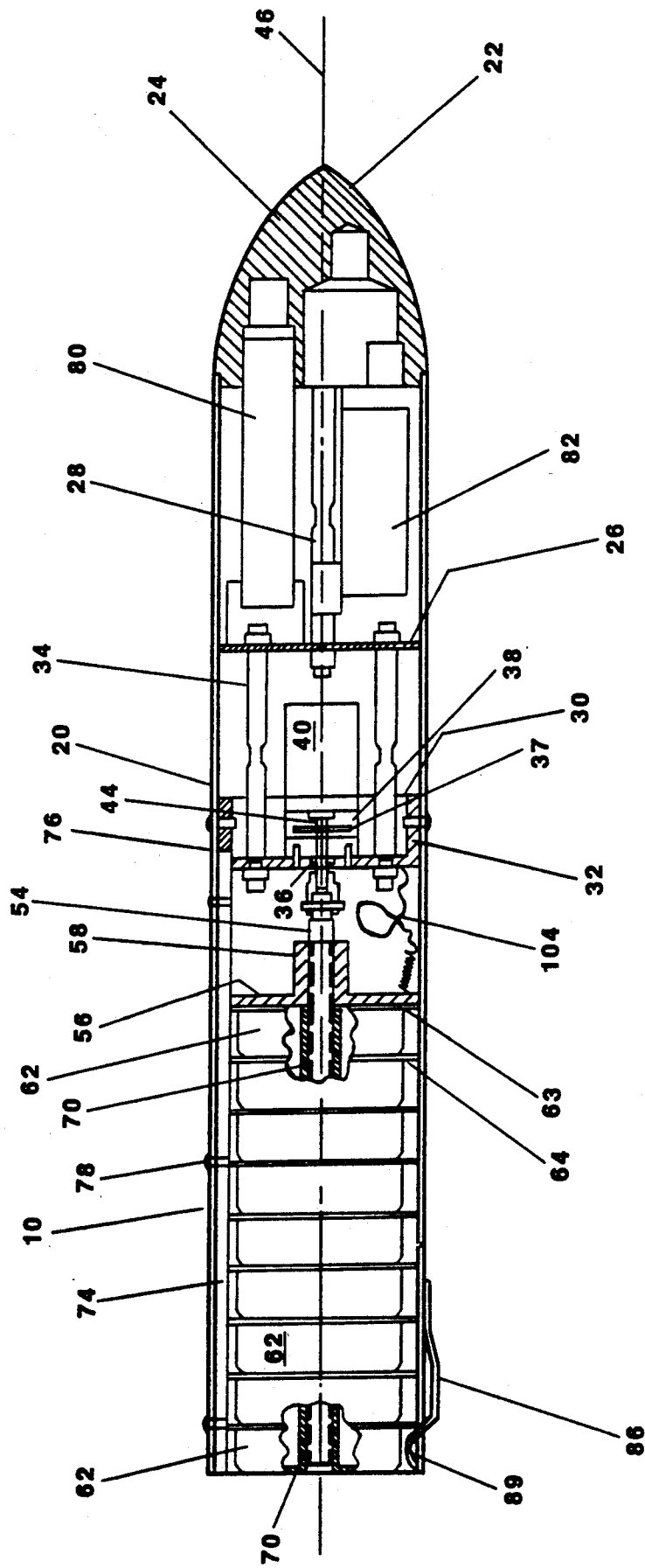
FIG. 2 is a longitudinal sectional view (with parts removed and other parts added) on an enlarged scale of the improved system as taken along line 2—2 of FIG. 1 and further illustrates details of the invention.
Figure 3:
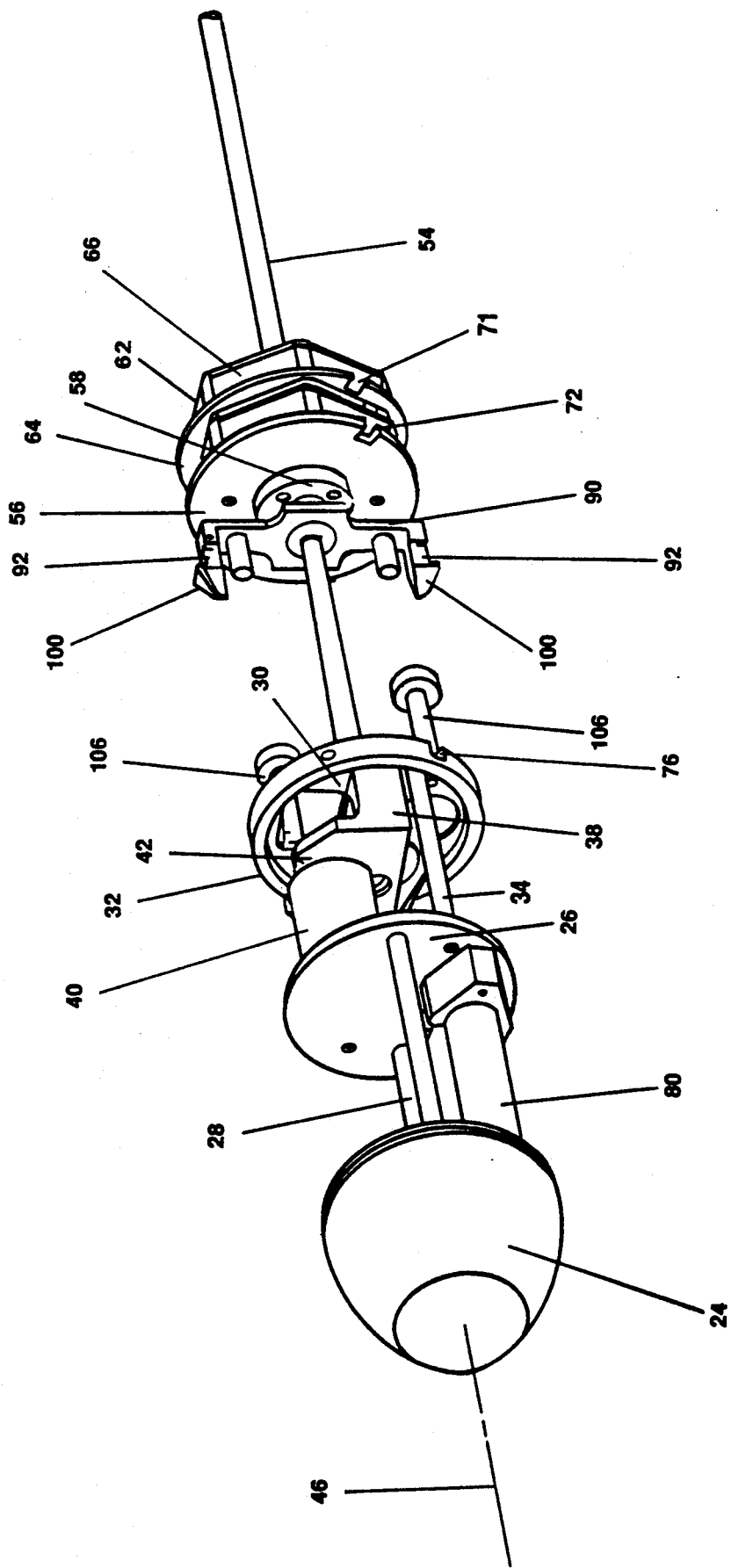
FIG. 3 is a perspective view of the improved system with parts removed and illustrates further details of the invention.

As best shown in FIG. 2, improved system 10 is generally made up of a tubular housing means 20 having one end closed; with the closed end being preferably of conical shape. The housing means including its closed end can be of any suitable material, e.g., ferrous, nonferrous, an alloy thereof or even of composite material; with any selected material being of appropriate thin wall construction and desired strength for handling loads during system use. The interior of the housing means at its closed end is provided with a suitable filler material 24 that serves to reinforce the closed forward end of the housing means especially when used on a movable platform. An innermost or base 26 is secured to the housing means and is parallel spaced from the inner end face of filler 24. A pair of laterally spaced parallel arranged reinforcing rods 28 extend between filler 24 and plate 26; and these rods are interconnected and affixed in suitable fashion therebetween as best depicted in FIGS. 2-3.

Figure 3A:
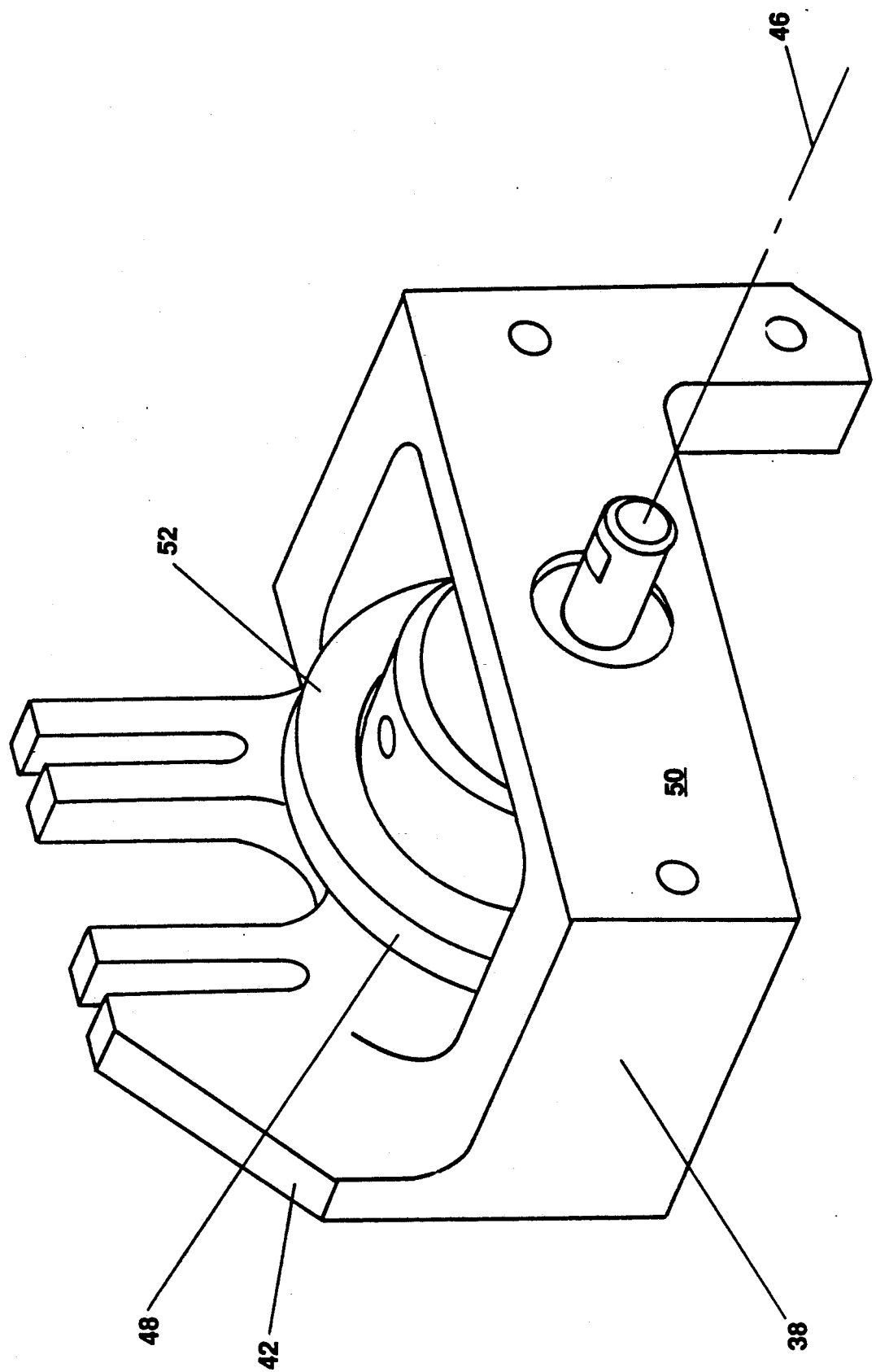
FIG. 3A is another and enlarged perspective view (as taken within the limits of encircling line 3A—3A of FIG. 4) with parts removed and other parts added and illustrates further details of the invention.

Another base plate 30 of circular shape and having forwardly extending annular flange 32 is also affixed to the interior of housing means 20 at a location outwardly of plate 26 but parallel spaced therefrom as indicated in FIG. 2. A pair of reinforcing parallel spaced bars 34 extend between and are suitably affixed to plates 26 and 30. Plate 30 is provided with a concentric aperture 36 for facilitating connection between a drive motor and a rotatable feed screw. Accordingly, as best shown in FIG. 3A a somewhat L-shaped motor mounting fixture 38 is affixed to the forward side of plate 30 and arranged inwardly of and spaced from flange 32. An electric motor 40 is affixed to the outer slotted wall 42 of fixture 38. In mounting the motor to the outer face of wall 42, motor output shaft 44 is ar laterally and radially offset from longitudinal axis 46 of housing means 20, as best shown in FIG. 3. As also in FIG. 3A, a combined driven-gear and flywheel stub shaft sub assembly 48 is bearingly mounted between the outer and inner longitudinally opposed spaced walls 42 and 50 so that gear shaft subassembly 48 is aligned with axis 46. Although not shown, it is to be understood that a smaller driving gear 37 which is connected to output shaft 36 of motor 40 interengages much larger gear 52 of subassembly 48 so that when the motor is energized, it rotatably drives same (gear 51) including the flywheel thereof as well as feed screw 54 that is coaxially connected to the outer end of motor stub or output shaft 44 of subassembly 48 as best depicted in FIG. 2. One of the reasons for the flywheel is that it maintains uniform rotation of feed screw 54.

Figure 4:
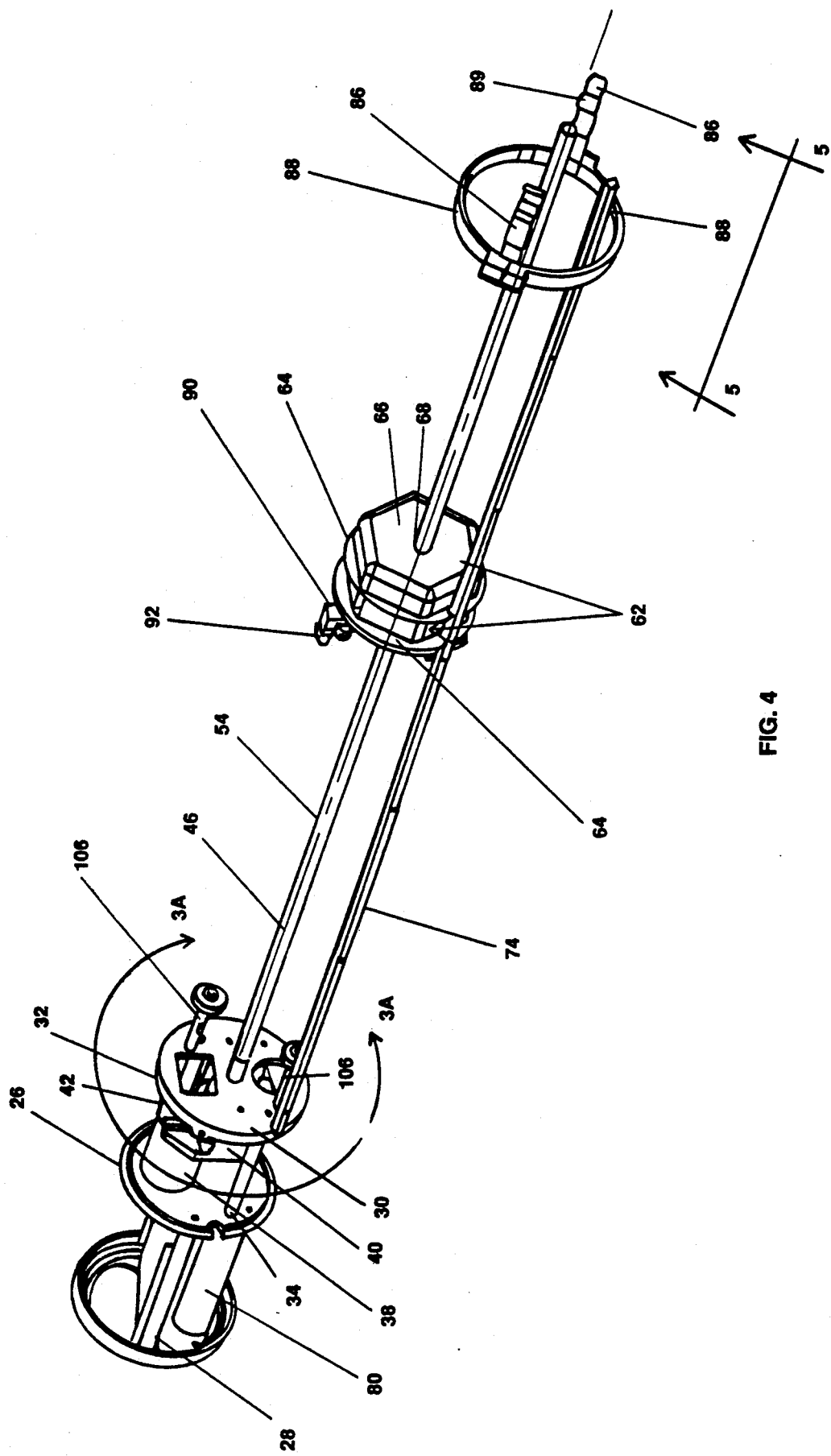
FIG. 4 is another perspective view with parts added and other parts removed and illustrates further details of the invention.

Another circular plate 56 having an inwardly extending apertured hub 58 is spaced outwardly from plate 30 toward the discharge end of housing means 20 as best illustrated in FIG. 2. The hub aperture is threaded for rotatably receiving and threadably engaging feed screw 54 between its ends during system use. The outwardly facing flat face 63 of plate 56 serves to abuttingly engage the inner face of an innermost stored element 62 of one or more elements stored in an element receiving/-dispensing chamber of the housing means 20. All elements are preferably of corresponding predetermined shape. As best shown in FIG. 4, to each of the elements is provided with a base plate 64 of circular shape that has an outer diameter less than the diameter of the housing means interior. A cover 66 of hexagonal shape is concentrically arranged on and suitably affixed to a major face of plate 64 so that element 62 is of pan-like configuration. As is evident in FIG. 4, an set of diametrically opposed chordal side walls of cover 66 are of a lateral extent less than the diameter of plate 64. Further, plate 64 is of a diameter slightly less than the interior diameter of housing means 20 so that element 64 freely moves within the element storage chamber of the housing means; with the chamber being between housing means ends as defined by plate 56 (with the plate being in either a fully retracted position or a patially extended position) and the open discharge end of housing means 20. Each element is provided with a concentric aperture 68 of corresponding shape as defined by a sleeve means 70 extending between the axial ends of each element 62 as best depicted in FIG. 2. The diameter of aperture 68 (see FIG. 4) is such that it is slightly larger than the diameter of feed screw 54 so that any element 62 slides freely lengthwise of feed screw 54 during system use. Depending on the use intended for any element 62, it may include explosives or any other desired means for impacting a designated target all for carrying out a mission by selectively dispensing one or more elements in relation to one or more targets in accordance with the invention.

Cooperative key and groove means are provided on each element 62 and plate 56 so as to prevent rotation of element 62 or plate 56 about axis 46 upon rotation of feed screw 54 when motor 40 is energized. To this end, base plate 64 of each element 62 is provided with a corresponding channel-shaped groove 71 at the outer perphery thereof as best illustrated in FIG. 3. Similarly, feed-screw advanceable plate 56 is also provided with a corresponding channel-shaped groove 72 at the outer periphery thereof. A longitudinally extending key means 74 of square-shape in transverse section extends between intermediate plate means 30 and the outer discharge end of housing means 20. The inner end of key means 74 is secured in a channel-shaped groove 76 provided in the outer periphery of plate means 30 as shown in FIG. 3. The key means is further secured between its ends at various points to the housing means by appropriate longitudinally spaced fastener means such as indicated at 78 in FIG. 2. In securing the key means to the housing means and plate means 30, the key means extends longitudinally of the housing means so that plate means 56 and elements 62 freely advance longitudinally in either direction (without rotation) in the housing means storage chamber between the housing means discharge end and any advanced or retracted position of plate means 56 during system use.

Although not heretofore mentioned, a battery power source 80 can be mounted between plate means 26 and filler material 24 as shown in FIG. 2. An electronic control unit 82 is provided; and it is mounted between rods 28 and between plate means 26 and filler material 24. For the sake of brevity, the programmed control circuit of control means 82 is believed to be within the skill of the art for operating motor 40 in selective fashion so as to rotate the motor in either direction thereby correspondingly rotating feed screw 54 for controllably advancing plate means 56 in either direction between any advanced and/or retracted positions for either receiving or selectively dispensing one or more elements, all in accordance with the invention.

To prevent accidental release of one or more stored elements 62, housing means 20 is provided with a leaf spring attachment at its discharge end. Housing means 20 as will now be set forth at its discharge end is provided with a pair of diametrically opposed apertures 84 with one being shown in FIG. 5. A pair of leaf spring elements 86 are affixed to the exterior of the housing means at its discharge end by opposed C-shaped elements 88. Each spring element when affixed has a raised inverted V-shaped intermediate portion 87 and an outer reversed V-shaped free-end portion 89 in registry with and inserted in its associated aperture 84 as best shown in FIG. 5. By virtue of the inward radial extent of each V-shaped portion 89 when it is inserted in its associated aperture 84, the opposed V-shaped portions cooperate to releasably and slidably engage diametrically opposed outer lateral chord portions of cover 66 and diametrically opposed outer peripheral portions of plate and 64 of any element 62 as it is being inserted or discharged from the housing means discharge end as best depicted in FIG. 2.

As best illustrated in FIG. 3, an apertured arm 90 of diametrical extent is concentrically affixed to the outer end of hub 58 to plate 56. The opposed outer ends of arm 90 have a diametrical extent less than or equal to the outer diameter of plate means 56. A pair of correspondingly shaped but reversely mounted lug means 92 are each hingedly mounted to their associated outer end at either end of arm 90, each lug means 92 is mounted about an axis transverse of axis 46 and biasingly urged to an outer position such as shown in FIG. 3. Arm 90 in being affixed to hub 58 is such that the pair of lug means 92 are longitudinally aligned with another pair of diametrically opposed apertures 94 at the housing outer end, with only one aperture being shown for the sake of brevity in FIG. 5. This second pair of apertures is radially offset from the first pair of apertures 84 as well as being arranged longitudinally inward thereof. Inner face 96 of each lug means 92 is of a radial extent for abuttingly engaging an outer transverse edge portion 98 of housing means 22 defining the outer longitudinal extent of either aperture 94. In other words, when plate means 56 is advanced to a fully extended position by feed screw means 54 being rotated by motor means 40, then each of the outwardly biased and diametrically opposed pair of lug means 92 (in being aligned with its associated aperture 94) advances outward to an outward position when in registry with the aperture until its lug face 96 abuts outer transverse edge portion 98 thereby positively stopping the further outward advancement of plate means 56 as indicated by the dotted lines in FIG. 5.

The outwardly disposed and inner facing transverse surface 100 of each lug means 92 is beveled in a direction that converges toward the inner closed end of the housing means. By means of this beveling of opposed lug means 92, the surfaces releasably engage inner concave-shaped edge portions 102 of the housing means that defines portions of each one of opposed apertures 94. When plate means 56 is advanced from a fully extended position to a retracted position, beveled surfaces 100 of opposed lug means 92 biasingly engage inner edge portions 102 so that opposed lug means 92 are progressively urged from a biased outward position to a retracted position for slidably engaging inner wall portions of housing means 22 as plate means 56 advances from a fully extended position to a retracted position during system use. Conversely, outer surfaces 100 of opposed lug means 92 biasingly and slidably engage opposed interior surfaces of the housing means as plate means 56 is advanced from any retracted positon to a fully extended position.

In order to assure that the plate means is always urged to a retracted position, spring biased tether means 104 is provided between plate means 30 and 56 as shown in FIG. 2. Accordingly, a coil spring and a rope-like element of appropriate length are interconnected to plate means 30 and 56 as shown. To prevent retraction of plate means 56 beyond a predetermined retracted position within housing means 22, a pair of rod-like laterally spaced, parallel arranged stop means 106 are provided as best shown in FIG. 3. As further evident in FIG. 3, the pair of stop means 106 are angularly offset about axis 46 from the pair of lug means 92 and arm 90 so that they don't interfere with one another during system use.

In an operative embodiment of the invention and with plate means 56 in a fully retracted position, a series of elements were loaded in appropriate fashion through the open discharge end of the housing means against the biased action of leaf springs 86. When all elements 62 are nested end-to-end together but in axially aligned relation to one each other as shown in FIG. 2 for a fully loaded housing means 22, then the aircraft platform can carry out its flight plan and intended mission. When the aircraft is over a target area, programmed operation of the control circuit in housing 82 (as shown in FIG. 2) results in timely operation of propelling motor 40 and ultimate dispensing of one or more elements 62 from the open discharge end of the housing means when plate means 56 is controllably advanced from one position to another in housing means 22 as effected by programmed feed screw rotation. After the aircraft has carried out its mission of striking one or more targets and has fully dispensed all or most of its elements, it can return to a designated area for reloading and continued use of the improved launching system.

While it has been shown and described herein a present a preferred embodiment of the invention, it is to be understood that the invention is not limited thereto, but maybe otherwise embodied all within the scope of the appended claims.

What is claimed is:

1. An improved launching system for a platform and for selectively and controllably dispensing one or more elements of predetermined shape in relation to a designated target area, said system comprising:

tubular housing means having a closed end and an open discharge end, a chamber between the open discharge and closed ends for receiving and storing a series of elements in nested end-to-end and axially aligned relation prior to dispensing one or more elements from the open discharge end during housing means use, motor-driven, feed-screw propelling means affixed to the interior of the housing means at the closed end thereof such that the propelling means is axially aligned with the longitudinal axis of the housing means, said propelling means being generally comprised of base plate B/P means, motor means, rotatable feed screw means and advanceable/retractible A/R plate means, the B/P means being affixed to the interior of the housing means at the closed end thereof, motor means affixed to the B/P means, feed screw means connected to the motor means and rotatably connected to the A/R plate means such that the feed screw means is axially aligned with and coincidental with the longitudinal axis of the housing means, and cooperating slot and longitudinally extending key means arranged on the A/R plate means and on the interior of the housing means and extending between the B/P means and the open discharge end of the sleeve means for preventing rotation of the A/R plate means while at the same time permitting advancement of the A/R plate means between the B/P means and the open discharge end of the housing means whereby one or more elements is stored in the chamber in end-to-end nested axially aligned relation between the A/R plate means and the open discharge end of the housing means when the motor means is rotated in one direction, and whereby one or more stored elements is selectively and controllably dispensed from the discharge end of the housing means when the motor means is rotated in an opposite direction.

2. A system as set forth in claim 1, wherein said motor means includes flywheel means for maintaining uniform rotation of the feed screw means.

3. A system as set forth in claim 1, wherein each one of the elements is of uniform hexagonal shape and pan-like configuration, and wherein each element has a concentric aperture for freely receiving the feed screw means when each element is loaded into the interior of the housing means at its open discharge end during system use.

4. A system as set forth in claim 1, wherein battery-powered control BPC means is provided between the B/P means and the closed end of the housing means, and wherein the BPC means is arranged therebetween within the interior of the housing means such that the BPC means is connected to the motor means.

5. A system as set forth in claim 1, wherein the housing means at the outer discharge end is provided with diametrically opposed apertures, and wherein the exterior of the housing means is provided with diametrically opposed leaf spring means affixed thereto such that each leaf spring means is aligned with and in registry with its associated aperture of the diametrically opposed apertures, whereby each leaf spring means is partially inserted in its associated aperture for positively engaging or retaining an element in the interior of the housing means at the open end thereof until positively dispensed by the A/R plate means upon actuation of the motor means for rotating the feed screw means in a direction to controllably advance and dispense one or more elements at the outer end of the housing means.

6. A system as set forth in claim 1, wherein the B/P means is provided with stop means extending in a longitudinal direction toward the A/R plate means, wherein the stop means is of longitudinal extent for limiting retractible movement of the A/R plate means in a direction toward the B/P means.

7. A system as set forth in claim 1, wherein a combined spring-tether means is provided between and interconnected to the B/P means and the A/R plate means, whereby the tether means biasingly urges the B/P means to a retracted position.

8. A system as set forth in claim 1, wherein the A/R plate means is provided with rearwardly extending diametrically opposed lug means, the lug means extending in a direction toward the B/P means, each lug means of the diametrically opposed lug means being separately mounted for pivotal movement about an axis transverse to the longitudinal axis of the housing means and in a radial direction outward and away from the longitudinal axis as well as being biased in an outward radial direction.

9. A system as set forth in claim 8, wherein the outer discharge end of the housing means is provided with a pair of aperture means, each aperture means of the pair being longitudinally aligned with its associated lug means so as to freely receive its lug means when the A/R plate means is advanced in an an outward direction from a retracted position to an extended position, whereby the opposed lug means become in reigistry with the aligned aperture means when the A/R plate means is in an extended position, thereby preventing further advancement of the A/R plate means and accidental dispensing of the A/R plate means from the outer discharge end of the housing means.

10. A system as set forth in claim 8, wherein each lug means is of inverted somewhat V-shaped configuration in longitudinal section such that the outer face of either lug means facing in a direction towards the closed end of the housing means is of beveled profile for releasably engaging its associated surrounding inner edge portions of the housing means about its respective aperture means so that the A/R plate means is retractible from an extended position to a retracted position when the rotatable feed screw means is actuated by the motor means.

11. A system as set forth in claim 10, wherein the outwardly facing face of each lug means which faces in a direction toward the outer discharge end of the housing means is of a radial extent for positively engaging its associated surrounding outer edge portions of the housing means that defines its respective associated aperture means thereby preventing further advancement of the A/R plate means.

* * * * *